Dec. 26, 1939.    J. H. DEVINE    2,184,336
LUNCH BOX
Filed Jan. 11, 1936    7 Sheets-Sheet 1

Inventor:
James H. Devine
By:
Brown, Jackson, Boettcher & Wiener
Attys

Dec. 26, 1939. J. H. DEVINE 2,184,336
LUNCH BOX
Filed Jan. 11, 1936 7 Sheets-Sheet 2
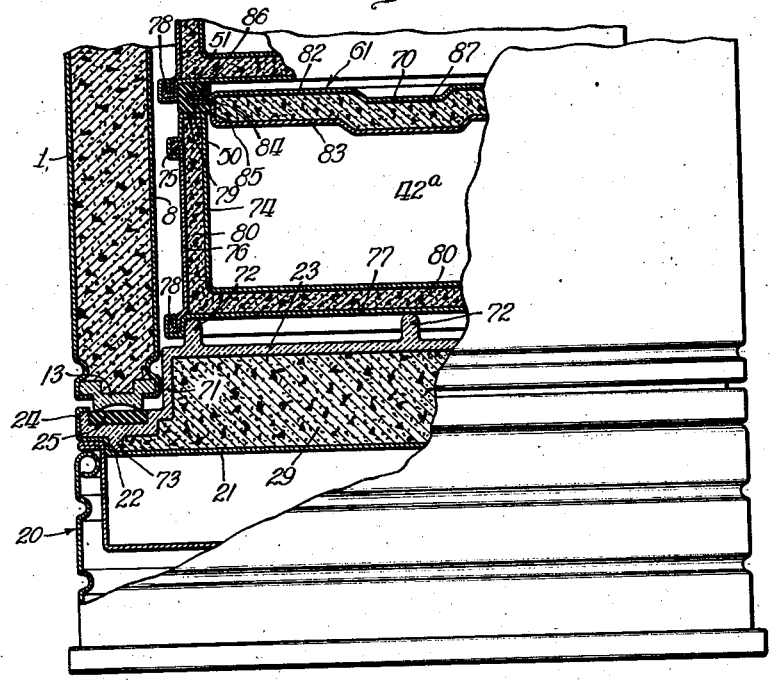
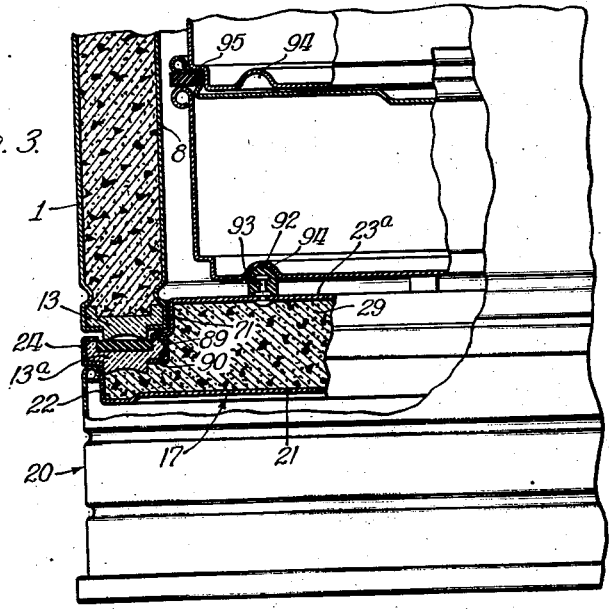
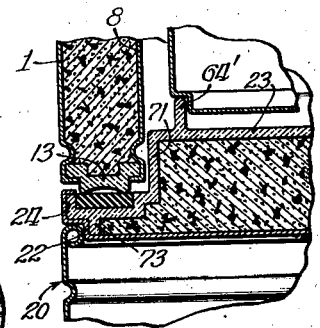
Inventor:
James H. Devine
By: Brown, Jackson, Boettcher + Dienner
Attys.

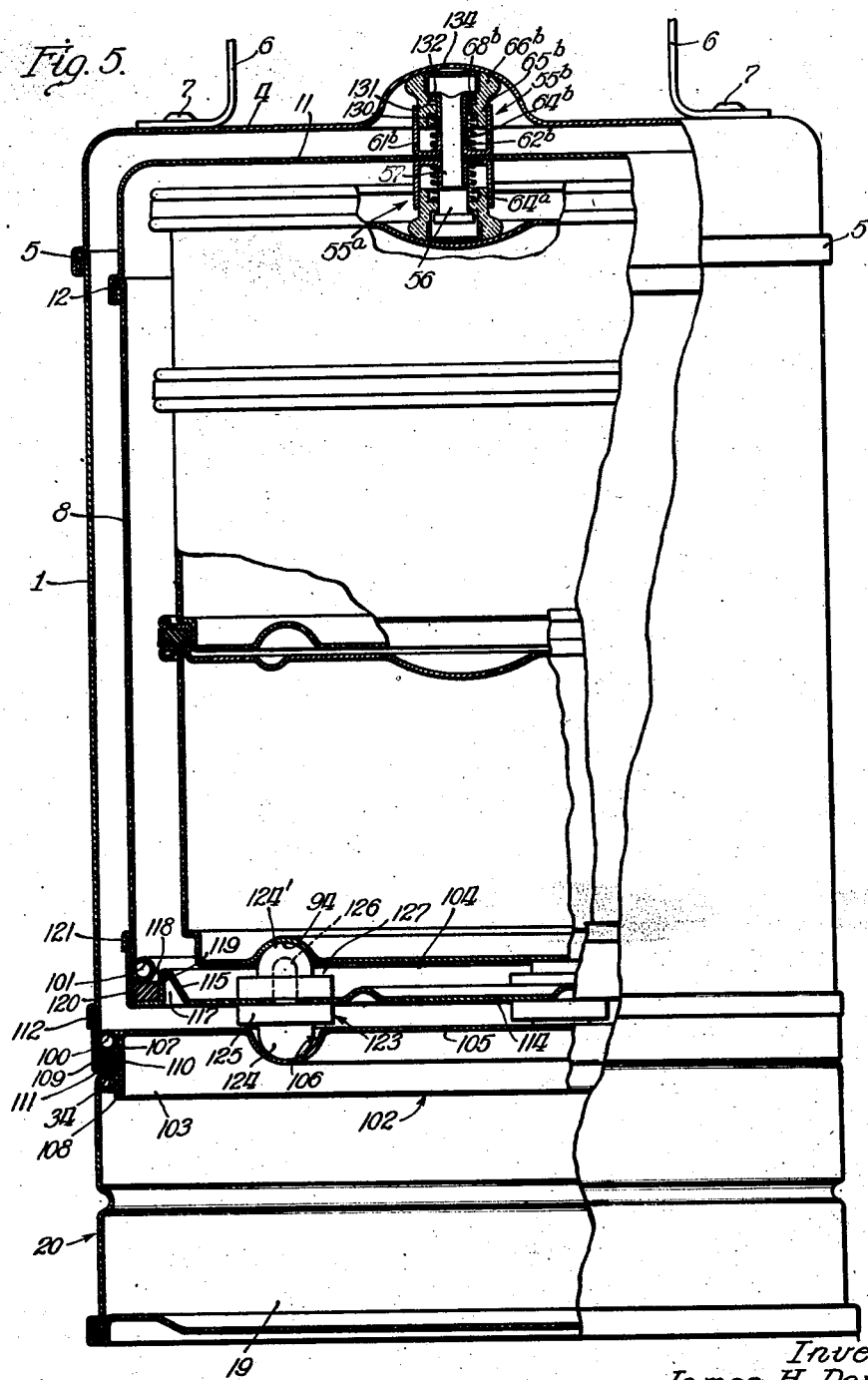

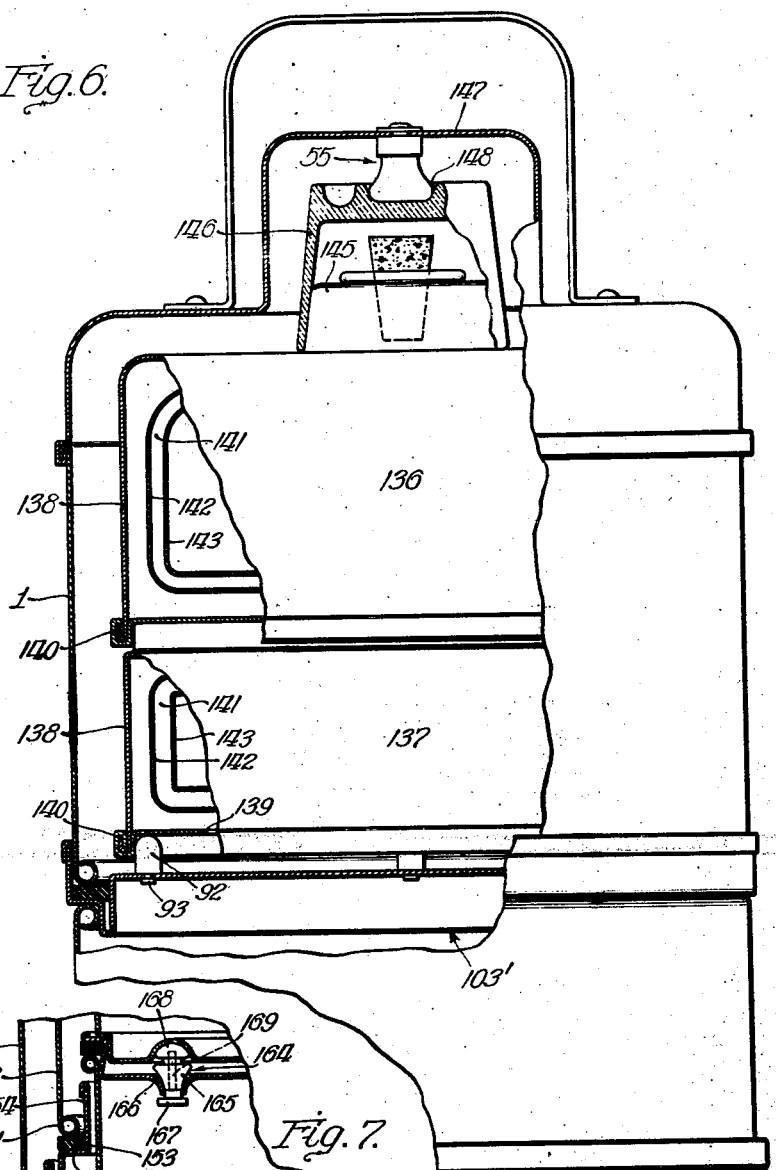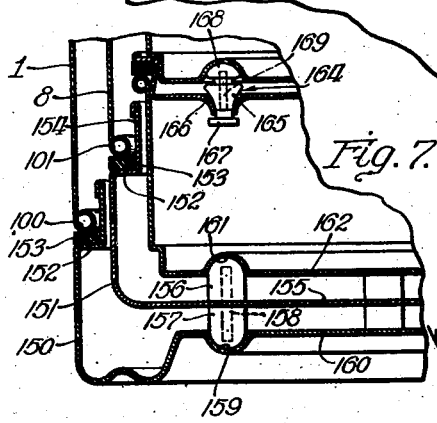

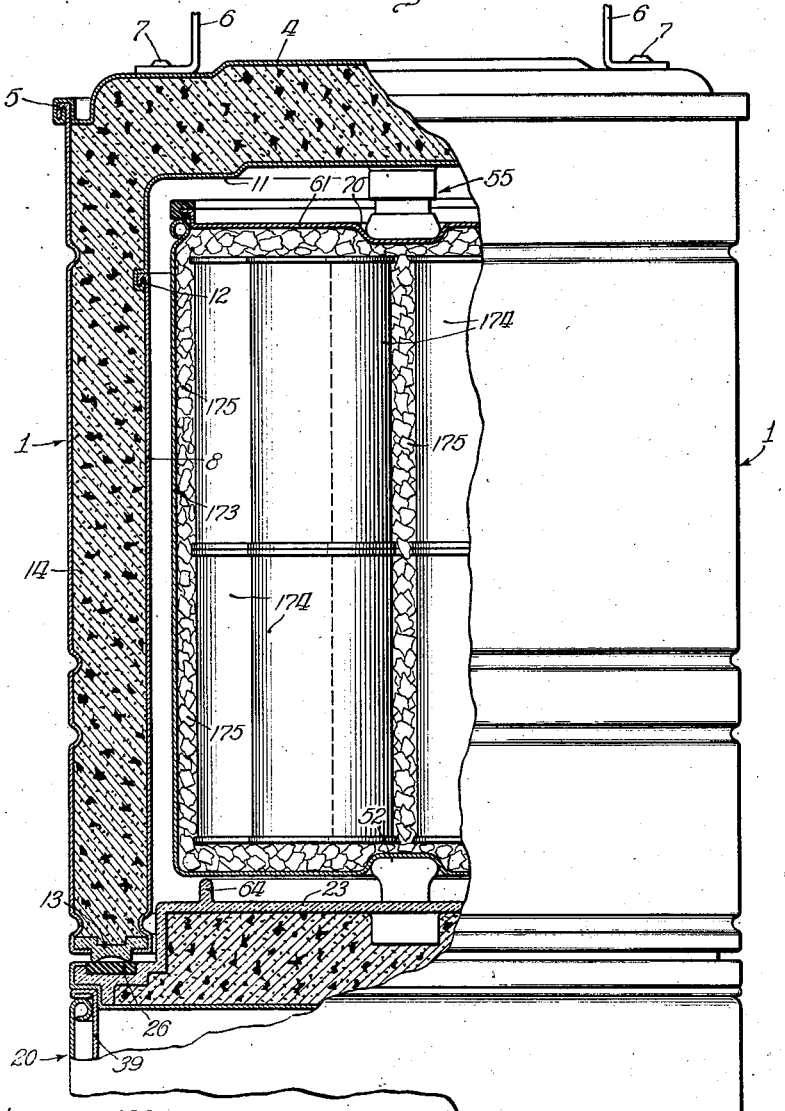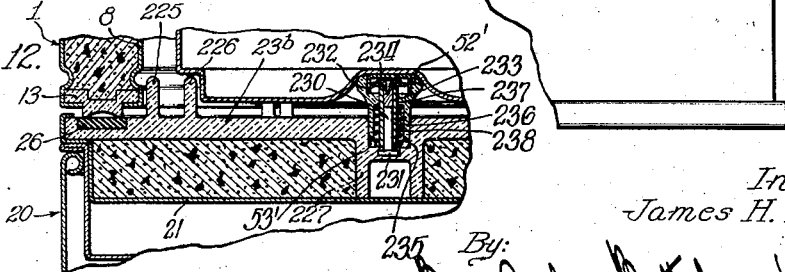

Dec. 26, 1939.  J. H. DEVINE  2,184,336
LUNCH BOX
Filed Jan. 11, 1936  7 Sheets-Sheet 6

Inventor:
James H. Devine

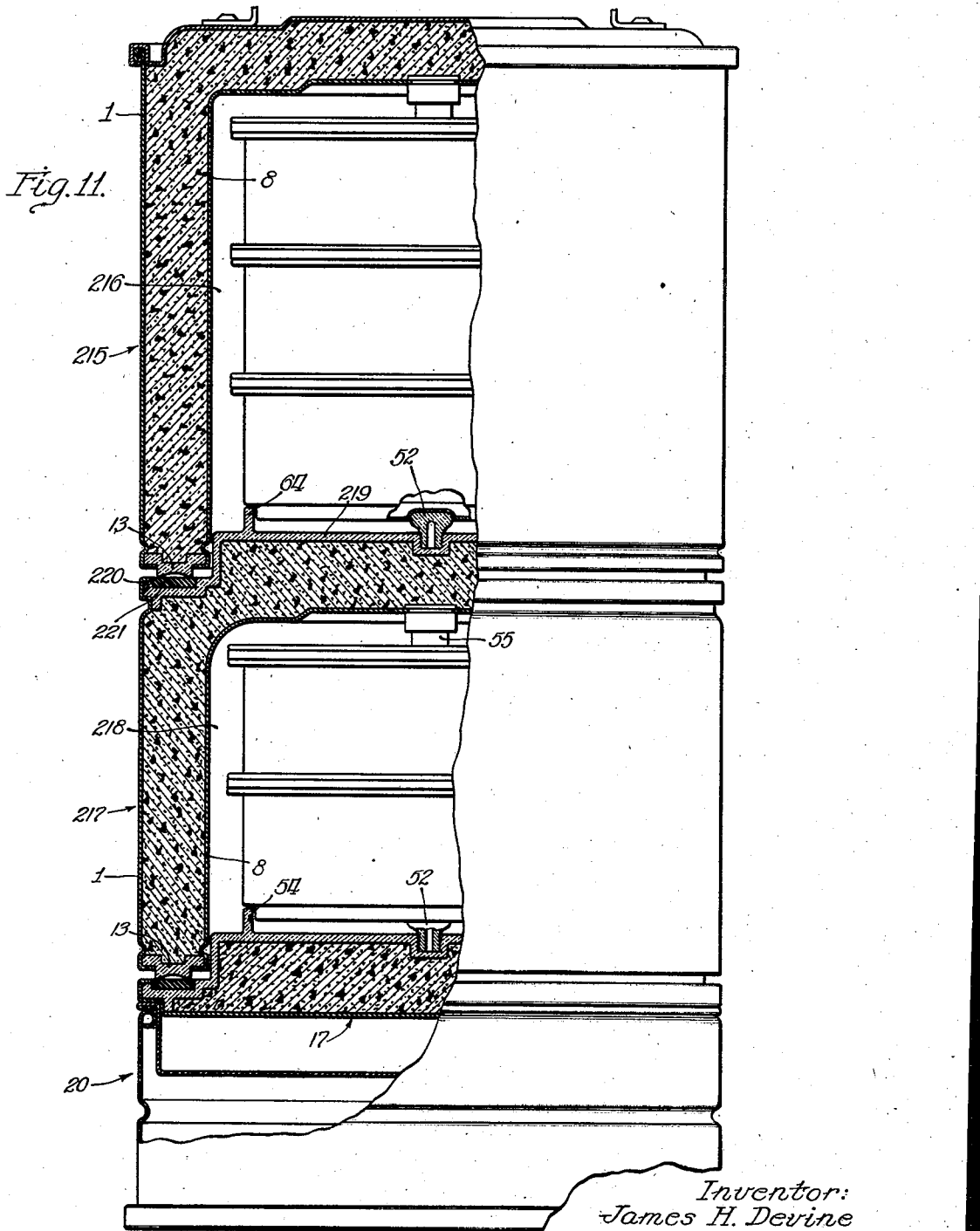

Patented Dec. 26, 1939

2,184,336

UNITED STATES PATENT OFFICE 2,184,336

LUNCH BOX

James H. Devine, Ste. Genevieve, Mo., assignor, by mesne assignments, to Dev-Insular Company, a corporation of Missouri Application January 11, 1936, Serial No. 58,736

9 Claims. (Cl. 206—4)

My invention relates to containers for comestibles, and more particularly to lunch boxes that are thermally insulated in such manner as to retain comestibles in either a hot or cold condition. Briefly, the type of device to which my invention pertains comprises an outer casing, an inner casing thermally insulated from the outer casing, and a plurality of superposed food tanks which are disposed within and held in spaced relation to the inner casing.

Broadly stated, the chief object of the present invention is to provide a device of the character described having high thermal efficiency so that the loss of heat from the food tanks, as well as from the box as a whole, will be reduced to a minimum.

The lunch box of the present invention is in the nature of an improvement over the lunch box disclosed in my copending application, Serial No. 751,519, filed November 5, 1934, and now matured into Patent No. 2,147,886. In such application it will be noted that the insulated divider seats on the upper open end of the inner liner and is secured thereto by the closure member for the outer casing. This places the insulated divider at a point over the uppermost food tank. While this construction of box has proven itself highly efficient and practical under conditions of use, I now find that, where the box is employed to keep food hot, the rate of heat loss from the food tanks and from the inner casing can be more greatly retarded if the insulated divider is disposed at a point adjacent the lowermost food tank. The reason for this, of course, is that the heated air within the inner casing normally rises and tends to collect in the upper portion of the inner casing. From an insulation standpoint, the seam formed between the outer and inner casings and the insulated divider therefor, is probably the weakest point of the box, and where this seam is disposed at a point adjacent the uppermost food tank, where the collection of heat is greatest, there will naturally be more of this heat lost through the seam in this position than there would be if the seam were disposed at a point remote from the point of the box where the collection of heat is greatest.

More specifically, therefore, it is an object of the present invention to provide a construction of lunch box wherein the outer and inner casings are normally closed at the top and open at their lower ends. The lower open ends of the casings are adapted to be closed by a suitable insulated divider, which is secured thereto by the closure member for the outer casing. Means carried by the insulated divider, and associated with the lowermost food tank, is adapted to support the nested food tanks within the inner liner. In such a construction of box the seam between the insulated divider and the inner and outer casings will be disposed below or adjacent the bottom of the lowermost food tank. Consequently, as the heated air rises within the inner casing it will be confined therein by the closed upper end of the inner casing and, as the weakest part of the box, or the seam between the insulated divider and the casings, is disposed at a point in the box remote from the point where the collection of heat is greatest, there will be less loss of heat through the seam and, accordingly, an improvement in the efficiency of the box.

Another feature of the present invention resides in the provision of means for supporting the inner casing within the outer casing and in spaced relationship thereto. In one form of the invention the inner casing is disposed within and rigidly held in spaced relation with respect to the outer casing by a collar of heat insulating material. In another form of the invention, the insulated divider is of two part construction and comprises a closure member for the inner casing and a closure member for the outer casing. Means carried by the closure member for the inner casing cooperates with means on the closure member for the outer casing to restrain lateral movement of the open end of the inner casing with respect to the outer casing, but permitting vertical movement thereof, while vertical yieldable means cooperating between the closed ends of the casings serve to restrain lateral movement of the closed end of the inner casing with respect to the outer casing and, at the same time, to yieldably support the inner casing for vertical movement with respect to the outer casing.

Still other features of the invention reside in the particular construction of the insulated divider, and the means carried by said divider which cooperate with the lowermost food tank to support the nested tanks within the inner casing and out of contact with the divider, as well as to restrain lateral movement of the lower tank with respect to the inner casing. In certain forms of the invention, the food tanks are supported out of contact with the divider and restrained from lateral movement by a single point of support. In other forms of the invention an annular ring projects upwardly from the divider and cooperates with a downwardly extending boss on the lowermost food tank, whereby the tanks are supported out of contact with the divider and restrained from moving laterally with respect to the inner casing. In still other forms of the invention, a plurality of feet cooperate with an upwardly pressed annular channel formed in the bottom wall of the lowermost food tank to accomplish the foregoing functions, while in a further form of the invention a downwardly extending flange on the lowermost food tank cooperates with upwardly projecting feet on the divider, whereby the tanks are supported and restrained from lateral movement.

A further feature of the invention resides in the provision of means which has the double function of restraining lateral movement of the uppermost food tank with respect to the inner casing, and yieldingly urging said tanks together. The reasons, as well as the necessity for yieldingly urging the nested food tanks together, have been fully pointed out in my above mentioned copending application, and also in my copending application, Serial No. 644,266, filed November 25, 1932, for Lunch box, now matured into Patent No. 2,026,967, to which reference may be had.

In my application, Serial No. 751,519, the means yieldingly urging the tanks together comprises an inherently resilient strap. A spring pressed knob carried by the strap cooperates with the insulated divider to restrain lateral movement of the upper tank, and also assists the strap in yieldingly urging the tanks together. In the present invention the strap has been dispensed with. The yieldable knob is directly carried by the wall closing the upper end of the inner casing. This knob cooperates with a depression formed in the closure member of the uppermost food tank to yieldingly urge the tanks together, and to restrain lateral movement of said tanks with respect to said casing. In certain forms of the invention the yieldable knob for the nested food tanks, and the aforementioned means which yieldingly supports the inner casing within the outer casing, has common means for securing them to the top wall of said inner casing.

A still further feature of the invention resides in the particular construction of double-walled food tanks and double walled closure members therefor, for use in a box as above described.

It is also a feature of the present invention to dispose a plurality of nested vacuum dishes directly within the outer casing, these vacuum dishes comprising an outer metal shell having a double wall dish secured therein from which the air has been partially exhausted. The use of such dishes eliminates the necessity for an inner liner.

It is still another feature of the present invention to provide a box of the type above described with an insulated compartment for carrying a supply of drinking water, such a provision being of especial advantage to persons who work in mines and like places.

Another feature of the invention resides in providing means for venting the food tanks to atmosphere, whereby any vacuum which may develop within a hot food tank can be destroyed, and thereby permit of easy removal of the closure member of the tank. This is of especial importance where the food tanks are used in picnic kits and the like. In such cases, the tanks are much larger than the tanks employed in the ordinary lunch box, and it is found in such size tank that a powerful vacuum is set up within the tank upon cooling of the hot food, which makes it exceedingly difficult to remove the closure members therefrom. By the present invention, this vacuum may be quickly destroyed, and the closure members are then readily removed from their respective tanks.

Still another feature of the invention resides in a construction of lunch box wherein both hot and cold foods may be carried and effectively insulated from each other.

Other objects and advantages of the invention will appear from the following detailed description of the invention when taken in connection with the accompanying drawings, in which:

Figures 2, 3 and 4 are fragmentary views, partly in vertical section and partly in front elevation, of the insulated divider, as well as modified forms of the means supporting the nested food tanks within the inner casing and out of contact with the divider, as well as restraining lateral movement of said tanks with respect to said casing;

Figure 5 is a view, partly in section and partly in front elevation, of a modified form of lunch box embodying the principles of the present invention and showing the means yieldingly supporting the inner casing within the outer casing;

Figure 6 is a view, partly in vertical section and partly in front elevation of a lunch box employing vacuum dishes, thereby permitting the elimination of the inner liner;

Figure 7 is a fragmentary vertical sectional view of a picnic box, showing the means for destroying the vacuum within the food tanks;

Figure 8 is a fragmentary view, partly in section and partly in front elevation, of a box having a single tank within the inner casing, in place of the plurality of nested food tanks, this tank being adapted to receive a plurality of individual beverage tanks;

Figure 11 is a view, partly in vertical section and partly in front elevation, of a lunch box adapted to carry both hot and cold foods; and Figure 12 is a fragmentary vertical sectional view of a modified form of the insulated divider.

Figure 1:
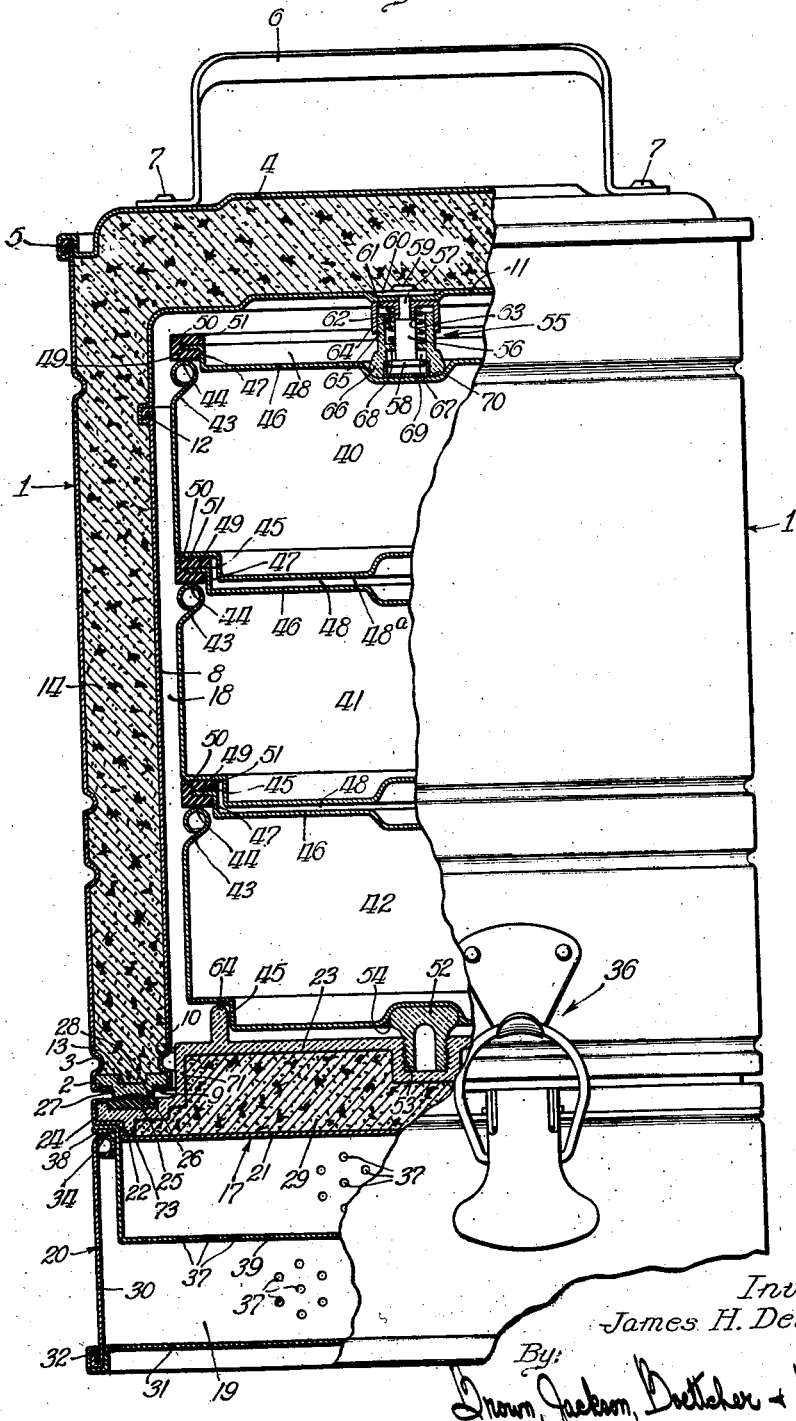
Figure 1 is a view, partly in vertical section and partly in front elevation, of a lunch box embodying the principles of the present invention.

Referring now in detail to Figure 1, I construct a lunch box as shown therein by providing an outer casing 1 of generally cylindrical shape, although it may be constructed in any desired form without departing from the spirit of the present invention. This casing may be formed of any suitable material, although I preferably use sheet aluminum or tin. The outer surface of the casing may be painted or finished in any suitable or preferred manner, or, if desired, the outer surface of the casing may be covered with leather or other suitable material so as to present an attractive appearance. At its lower end the casing is open and the marginal edge thereof is bent inwardly to provide an inwardly extending annular flange 2. The casing is also provided with an inwardly pressed annular bead 3, disposed a relatively short distance above flange 2, and at its upper end the casing is closed by a wall 4, which is seamed thereto as shown at 5. A handle 6, secured to the wall 4 as by the rivets 7, facilitates the carrying of the box.

Within the casing 1, I dispose an inner casing 8, preferably formed of tin or aluminum. This casing is spaced from the outer casing and is also open at its lower end. The marginal edge of the casing is provided with an outwardly extending annular flange 9 and, a short distance thereabove, with an outwardly pressed annular bead 10. Like casing 1, casing 8 is closed at its upper end by a wall 11 which is secured to the casing as by the seam 12.

At its lower end casing 8 is spaced apart from and firmly secured to outer casing 1 by means of a collar 13, preferably formed of a suitable heat insulating material. The details of this collar are fully set out in my copending application, Serial No. 751,519, above referred to, and need not, therefore, be repeated here. Suffice it to say that the collar is suitably cemented in the space between the casings, and between the flanges 2 and 9 and the beads 3 and 10, which limit movement of the collar with respect to the casings. The space 14 between the casings is preferably filled with a suitable heat insulating material, such as granulated cork, which, in addition to serving as an insulating medium, also serves to support the upper end of the inner casing and to restrain lateral movement of said casing with respect to the outer casing.

In assembling the casings, beads 3 and 10 are first formed in the outer and inner casings, respectively. Collar 13 is then seated on these beads, after which flanges 2 and 9 of the outer and inner casings, respectively, are rolled over the collar and cemented thereto. The granulated cork is then poured into space 14, after which top wall 4 is seamed to the outer casing.

An insulated divider, designated generally by the reference character 17, is associated with collar 13 and serves to thermally insulate the compartment 18 formed by casing 8, from a compartment 19 formed by a closure member, designated generally at 20. This divider is in the form of a closed cup, having a bottom wall 21, a side wall 22 and an upper wall 23. The side and bottom walls of the cup are of unitary construction and preferably formed of tin or aluminum, while the upper wall 23 is preferably formed of a suitable heat insulating material, such, for example, as "Bakelite". The space 29 between these walls is preferably filled with a suitable heat insulating material, such, for example, as granulated cork.

As shown, side wall 22 of the cup adjacent the peripheral edge is bent outwardly and upwardly and then bent inwardly to form a channel 24. The peripheral edge of top wall 23 engages in this channel and is secured therein by any suitable cement. Preferably an annular ring 73 is formed on the bottom surface of wall 23, this ring being disposed in abutting relation with side wall 22 and seating on bottom wall 21 of the divider. Adjacent its peripheral edge, top wall 23 is provided with a recess 25 for the reception of a gasket 26. When the lunch box is placed in position on the divider, the ridges 27 and 28 of collar 13 seat on gasket 26 and form a double seal therewith.

Closure member 20 is preferably formed of tin or aluminum and comprises a side wall 30 and a bottom wall 31 secured together as indicated at 32. The height of side wall 30 of the closure member is such that the compartment 19, formed by the closure member and the divider, will be sufficiently large to receive articles of food, such as bread, cake, or the like.

At its upper peripheral edge, side wall 30 is provided with an inwardly rolled bead 34 which is adapted to provide a seat for an outwardly extending annular flange 38 of a tray 39. Tray 39 is disposed in closure member 20 as shown, and is adapted to receive articles of food, or articles of service, such as knives, forks, spoons, and the like. Closure member 20 is secured to outer casing 1 by fastening devices, indicated generally at 36, and the pressure exerted by such devices upon the closure member and casing serves to clamp the divider 17 and tray 39 firmly between bead 34 and collar 13 and thereby assure an air-tight seating engagement between ridges 27—28 of the collar and gasket 26 of the divider. Vent holes 37 are preferably formed in the side wall of both the closure member 20 and tray 39 to permit circulation of air through compartment 19, and through the tray 39.

Disposed within casing 8 is a plurality of nested containers or food tanks 40, 41 and 42. These tanks may be constructed of any suitable material, depending largely upon the characteristics of the substance to be placed in the tanks. Under ordinary conditions, these tanks may be constructed of sheet aluminum. Each of the tanks, adjacent their upper open ends, is necked inwardly, as indicated at 43, and then rolled outwardly to provide a bead 44. At their lower ends, each of the tanks is reduced in diameter to provide a shoulder 45. A closure member 46, having an upwardly extending side wall 47 forming a depression 48, is provided for each of the tanks. The marginal edge of the wall is turned outwardly to form a flange 49, and this flange is adapted to extend into a slot 50 formed in a gasket 51 to thereby secure the gasket to the closure member. This gasket is preferably formed of rubber or any other suitable resilient heat insulating material, and is adapted to seat upon the curled flange 44 of its associated food tank and provide a steam-tight fit therewith. The tanks are adapted to be stacked one upon the other, as shown, with the shoulder 45 of one tank disposed in the depression 48 of the closure member of the tank upon which it is stacked. Gasket 51, in addition to providing a steam-tight fit between the closure members and the tanks, also provides an insulating member between the bottom of each tank and the closure member upon which it is stacked, and also spaces the bottom of the tank 40 from the closure member 46 to provide an air insulating space 48a. Shoulder 45, seating within depression 48, serves to prevent relative lateral sliding movement of said tanks with respect to each other, and thereby to prevent disarrangement of said tanks within casing 8. The gaskets 51, as well as the tanks and the closure members therefor, are of symmetrical construction and are readily interchangeable with each other.

The food tanks are supported within casing 8 by suitable means carried by the insulated divider 17 and associated with the lowermost food tank. In the form shown in Figure 1, this means comprises a knob 52, forming a single centrally located point of support. This knob is preferably formed of a suitable heat insulating material and has threaded engagement in a recess 53, formed substantially centrally of top wall 23 of the divider. The knob projects above wall 23 of the divider and, as shown, engages in a recess 54 pressed upwardly in the bottom wall of the lowermost food tank. Preferably, each of the tanks is formed with this recess 54 to permit ready interchangeability of the tanks. Projection of knob 52 above wall 23 of the divider serves to hold the food tanks out of contact with such wall and, as knob 52 engages within the recess 54 of the lower food tank, lateral movement of said tank with respect to casing 8 is effectively prevented and the tanks are, therefore, also held out of contact with the side wall of such casing. To support the tanks upon knob 52 while they are being packed with food, the divider is provided with an annular ring 64, preferably formed integrally therewith. This ring encircles shoulder 45 of the lowermost food tank, but is preferably spaced therefrom and from the bottom wall of the tank a distance approximately $\frac{3}{32}$ inch to $\frac{1}{16}$ inch, when the tank is balanced evenly upon knob 52. Ring 64 merely limits the tilting of the tank about knob 52 when it is being packed with food. When the tanks are disposed in the position shown in Figure 1, the ring is normally out of contact with the lowermost tank, so that such tank has merely a single centrally located point of support with respect to the divider.

The uppermost food tank is held out of contact with the side wall of casing 8 and the top wall 11 thereof by means of a yieldable support designated generally at 55. This support comprises a shaft 56, one end of which is reduced in diameter as indicated at 57, and the other end of which is provided with a head 58. The reduced end 57 of the shaft extends through an opening in top wall 11 of casing 8 and is headed as shown at 59. Preferably, a washer 60 is disposed between head 59 of the shaft and wall 11 of casing 8. An inverted cup-shaped member 61, disposed in abutting contact with the under surface of wall 11, is provided with a central guide 62, through which reduced portion 57 of shaft 56 also extends. This guide, abutting a shoulder 63 formed by the reduced portion 57 of the shaft, prevents upward movement of the shaft with respect to wall 11, while the head 59 prevents downward movement of the shaft with respect to the wall, thereby rigidly mounting the shaft upon such wall.

Mounted upon shaft 56 for vertical sliding movement with respect thereto, is a knob 65 preferably formed of a suitable heat insulating material, such as Bakelite. This knob is provided with a head 66 and is of hollow construction, being provided with a central longitudinal bore 67. Shaft 56 extends into the bore of the knob, and the knob is guided in its vertical movement with respect to the shaft by an internal guide 68 and also by reason of the outer surface of the knob contacting the inner surface of the walls of cup member 61. A compression spring 64 encircles shaft 56 and has one end disposed in abutting engagement with the inner surface of the bottom wall of cup member 61, while the other end of the spring abuts the internal guide 68 formed in bore 67 of knob 65. This spring normally urges the knob downwardly with respect to shaft 56, such downward movement of the knob being limited by head 58 of the shaft, which is adapted to contact the internal guide 68. The lower open end of bore 67 is closed by a cap 69, preferably formed of Bakelite, which may be secured therein in any suitable or preferred manner, such as by cementing.

As shown, head 66 of knob 65 is adapted to seat in a depression 70 formed in the closure member of the topmost food tank. Each of the closure members is provided with this depression, so that they may readily be interchangeable with the tanks. By reason of its engagement in depression 70 of closure member 46, the knob prevents lateral movement of the topmost food tank with respect to casing 8 and, as the tanks cannot move laterally with respect to each other, the yieldable knob support 55 and the knob 52 effectively prevent lateral movement of the tanks, as a unit, with respect to their enclosing casing.

In addition to the above, the yieldable support 55 serves to yieldingly urge the nested food tanks together. When the tanks are filled with hot food and placed within casing 8, the tanks will be in an expanded condition due to the hot food, and the relative parts of the support will assume substantially the positions shown. In such position of the knob 65, the spring 64 is under compression. As the tanks cool, and therefore contract, the knob moves downwardly under the influence of spring 64 and assures that the tanks will be firmly maintained in their nested relationship, thereby preventing leaking and rattling of the tanks within the liner. This pressure upon the tanks also assures that the closure members will not be raised out of their respective tanks by reason of the expansion of any air which might be entrapped within the tanks.

It may here be pointed out that top wall 23 is provided with a guide portion 71, which normally projects upwardly into the inner casing 8 when the outer and inner casings are seated on the food tanks through the medium of the support 55. Guide portion 71 assures that collar 13 will be guided to its proper position on gasket 26, and it limits lateral movement of the lower end of the casings and thereby prevents teetering of the casings upon the tanks about support 55 when the fastening devices 36 are open.

Figure 2 shows a slightly modified manner of supporting the food tanks within the inner casing, as well as a modified form of food tank and closure member therefor. In this form of the invention, the food tanks are of double wall construction and comprise an inner tank 74, the upper marginal edge of which is bent outwardly and downwardly and seamed to the upper marginal edge of an annular ring at 75. This ring comprises the side wall of an outer tank 76 and the bottom of the tank is closed by means of a bottom wall 77 which is seamed to the lower marginal edge of the ring in the manner indicated at 78. The outwardly extending portion 79 of inner tank 74 serves to rigidly hold the inner tank 74 in spaced relationship with respect to outer tank 76, and the space 80 between said tanks is preferably filled with a suitable insulating material, such as granulated cork. Bottom wall 77 of the outer tank seats upon a plurality of feet 72 which are preferably formed integrally with top wall 23 of divider 17, and the engagement of these feet with the inner portion of seam 78 effectively prevents lateral movement of the tank with respect to inner casing 8, and at the same time the feet serve to support the lower tank out of contact with wall 23 of the divider.

Closure members 81 for these tanks are also of double wall construction and comprise an upper wall 82 and a lower wall 83. Upper wall 82 is provided with the depression 70 and, at its marginal edge, is slightly depressed and provided with an outwardly extending flange 84. Bottom wall 83 is provided with an upwardly extending side wall 85, which wall serves to space the lower wall 83 from the upper wall 82, and the marginal edge of this wall 85 is bent outwardly and upwardly and then inwardly to form a channel 86 for the reception of the flange 84 of the upper wall 82, to thereby rigidly secure the walls 82 and 83 together. In this form of the device, the gasket 51 has its channel 50 engaging over the seam formed by channel 86 and flange 84, and is thereby snugly secured to the closure member 61. As the seam 78 of the tank, which seats upon the closure member, has its inner surface extending downwardly over the outer surface of gasket 51, the tanks are restrained from lateral movement with respect to each other and to the enclosing casing 8. Preferably, space 87 between walls 82 and 83 is filled with a suitable heat insulating material, such as granulated cork.

Figure 3 shows a modified form of the insulated divider 17, and a second modified manner of supporting the food tanks upon such divider. In this form of the divider, the bottom and side walls 21 and 22, respectively, are substantially similar in configuration to the corresponding walls of the divider of Figure 1. The top wall 23a is, however, preferably formed of metal. Adjacent its marginal edge the wall 23a is bent downwardly to form the guide wall 71 and such downwardly extending portion is bent outwardly and then back upon itself to form the outwardly extending flange 89. From such flange, the wall extends downwardly and for a relatively short distance, and is then bent outwardly to form the annular channel 90. A collar 13a, of substantially the same configuration of collar 13, has its inner edge seating in channel member 90, and the outer edge of said collar seats in the channel 24 formed in side wall 22 of the divider. This collar is preferably cemented within the channels and is formed of a suitable heat insulating material to provide a heat break between the walls 23a and 22. The space 29 in this form of the divider is also preferably filled with a suitable heat insulating material.

On its upper surface, wall 23a of the divider is provided with a plurality of upwardly projecting feet 92, which feet are preferably formed of a suitable heat insulating material. These feet are secured to wall 23a by means of the rivets 93 and are adapted to engage in an annular channel 94 in the lowermost food tank, there being one of these channels pressed upwardly in the bottom wall of each of the tanks. Engagement of the feet in the channel serves to space the lowermost tank out of contact with top wall 23a of the divider and to prevent lateral movement of the tanks with respect to inner casing 8.

The food tanks and closure members are substantially similar to those shown in Figure 1. In the present instance, however, the food tanks do not have the necked-in portion 43 of the tanks of Figure 1. Also, the gasket 51a is carried in a channel 95 formed in the side wall of the closure members, instead of being carried in the manner shown in Figure 1.

The modified form of device shown in Figure 4 is substantially similar to that shown in Figure 1, except that in the present instance the insulating knob 52 of Figure 1 has been omitted, and the lowermost food tank seats directly upon the annular ring 64' which is formed integrally with top wall 23 of the divider. In this case the annular ring 64' engages the bottom wall of the lowermost food tank to support said tank out of contact with the top wall 23 of the divider, while the shoulder 45 of the tank engaging within the ring 64' is restrained thereby from moving laterally with respect to inner casing 8.

In each of Figures 2, 3 and 4, the uppermost food tank is preferably restrained from lateral movement with respect to the casing, and the nested food tanks are yieldingly urged together by the yieldable support 55, shown in Figure 1.

In the modified form of the device shown in Figure 5, the outer and inner casings are constructed in substantially the same manner as the corresponding casings of Figure 1, with the exception that the inwardly pressed beads 3 and 10 of the casings of Figure 1 have been omitted from the present casings, and instead of the flanges 2 and 9, the lower marginal edges of casings 1 and 8 are provided with an inwardly rolled bead 100 and 101, respectively. The collar 13 is omitted from this form of the device, and casings 1 and 8 are independently removable, respectively, from around the food tanks. Each of the casings is open at its lower end and is adapted to be closed by a two-part divider, designated generally at 102. The lower portion 103 of this divider constitutes a closure member for the open end of the outer casing 1, and the upper portion 104 of the divider constitutes a closure member for the open end of the inner casing 8. Each of the closure members is preferably formed of a suitable metal.

The closure member 103 has a substantially horizontal flat supporting portion 105 which is provided with a depression in the form of an annular channel 106. Adjacent the bead 100 of casing 1, the supporting portion 105 of the closure member is turned downwardly to form a side wall 107, and such side wall is bent back upon itself to form a depending flange 108. From such flange, the wall extends outwardly to form flange 111, and then upwardly to form with side wall 107 a channel 109 for the reception of a gasket 110. As shown, flange 111 of channel 109 seats on the bead 34 of closure member 20, which forms compartment 19. Bead 100 of casing 1 seats on gasket 110, and the flange 112 of channel 109 preferably extends for a short distance above the bead 100 to provide a guide for guiding the bead to its seat on the gasket. When the fastening device 36 (see Figure 1) is snapped closed, the closure member is effectively clamped between the beads 34 and 100 of the closure member 20 and casing 1, respectively. If desired, tray 39 of Figure 1 may be inserted in closure member 20, and with its flange 38 disposed between flange 111 and bead 34.

Closure member 104 is likewise provided with a substantially flat supporting portion 114 which, adjacent the bead 101 of casing 8, is turned outwardly and then upwardly to form a side wall 115, which side wall is in turn bent downwardly to form a triangularly shaped channel 117. From such channel the wall extends outwardly for a short distance and is then bent upwardly to form a channel 118, with the side wall 119 of channel 117, for the reception of a gasket 120. Bead 101 of casing 8 is adapted to seat on this gasket. Preferably, flange 121 of channel 118 extends for a short distance above bead 101 to guide the bead to its seat on the gasket.

Closure member 104 is supported upon and spaced from closure member 103 by a plurality of feet 123. These feet are preferably formed of a suitable heat insulating material, such as "Bakelite," and comprise a hemispherical portion 124 and a unitary disc portion 125. A pin 126 formed integrally with each of these feet extends upwardly through an opening in supporting portion 114 of closure member 104, and into a bore formed in a similar foot 127. Portion 124 of foot 123 seats in channel 106 in closure member 103 and, by reason of such engagement, closure member 104 is prevented from moving laterally with respect to casing 1. Likewise, as the closure member 103 is held against lateral movement, the lower open end of casing 8 will be held spaced from casing 1 and restrained from lateral movement with respect thereto by reason of the bead 101 thereof engaging within the flange 121 of closure member 104. The space between the casings 1 and 8 and the space between the closure members 103 and 104 constitute dead air spaces for thermally insulating the casings, as well as the closure members, from each other.

The nested food tanks are substantially similar in construction to the food tanks shown in Figure 3 and need not, therefore, be further described here. As shown, portion 124' of foot 127 extends into channel 94 of the lowermost food tank and thereby supports said tank out of contact with the closure member 104 and, in addition, also restrains lateral movement of said tank with respect to said closure member and the casing 8.

The uppermost food tank is restrained from lateral movement with respect to casing 8, and the nested tanks are yieldingly urged together by the yieldable support 55a. This support is constructed and operates in identically the same manner as the support 55 of Figure 1, to which reference is made. The only difference is that the reduced portion 57 of the shaft 56 extends through top wall 11 of casing 8 and into a second yieldable support 55b mounted upon such top wall of the casing. This second support serves to restrain lateral movement of the upper end of casing 8 with respect to casing 1, and to yieldingly support the casing 8 within casing 1. It also comprises a cup-shaped member 61b having an internal guide 62b. The reduced portion 57 of shaft 56 extends upwardly through guide member 61b, and also through a sleeve 130. This sleeve is provided with an outwardly extending annular flange 131 over which the upper end of the shaft 56 is headed, as indicated at 132. As the shaft is headed over flange 131 of the sleeve, and as the sleeve abuts the internal guide 62b, the shaft is prevented from moving downwardly with respect to wall 11 of the casing. Upward movement of the shaft is prevented in the same manner as set out in connection with the yieldable support 55 of Figure 1. In all other respects, the yieldable support 55b employs the same elements arranged as and operating in the manner of support 55 of Figure 1, namely, the insulating knob 65b having the internal guide 68b which engages sleeve 130 for vertical movement with respect thereto, and the compression spring 64b, which normally urges the knob upwardly with respect to the sleeve. Preferably the spring 64b is made slightly stronger than the compression spring 64a of support 55a. Head 66b of knob 65b engages in an upwardly embossed portion 134 in top wall 4 of outer casing 1, thereby preventing lateral movement of the upper portion of casing 8 with respect to casing 1. At the same time, it acts as a yieldable support to yieldingly support casing 8 within casing 1.

In the modified form of the device shown in Figure 6, the inner casing 8 has been omitted. The outer casing 1 is, however, constructed in the same manner as the outer casing 1 of the device of Figure 5, and the open end of the casing is closed by a closure member 103' which is similar in construction and operation to the closure member 103 of Figure 5. Casing 1 directly encloses a pair of food tanks 136 and 137.

Each of these tanks 136 and 137 comprises an outer shell formed of aluminum or other suitable material. The outer shell comprises a side wall 138 to which a bottom wall 139 is secured as by the seam 140, this seam projecting below the bottom wall 139. Within the shell and spaced therefrom is a vacuum chamber 141, which may be secured within the shell in any suitable or preferred manner. This chamber is in the form of two parallelly spaced and relatively thin glass walls 142 and 143, from which the air in the space therebetween has been partially exhausted. The tanks are stacked one upon the other, as shown, and the lower tank is spaced from closure member 103' and restrained from moving laterally with respect thereto, and with respect to casing 1, by means of a plurality of heat insulating feet 92, these feet being secured to the closure member 103' by rivets 93, as in the device of Figure 3.

The uppermost tank 136 is in the form of a flask, being provided with a neck 145. This neck extends upwardly and has abutting engagement within a drinking cup 146, carried by the flask. Cup 146 extends upwardly into a raised portion 147 formed in the top wall 4 of casing 1, and such raised portion has the yieldable insulating knob 55 secured thereto. This knob engages in a depression 148 formed in the bottom wall of the drinking cup, to thereby restrain lateral movement of tank 136 with respect to outer casing 1, and to yieldably urge said tanks together.

The modified form of device shown in Figure 7 is adapted for use as a picnic box, and comprises the outer casing 1 and inner casing 8, both of these casings being constructed in the manner of the casings of Figure 5. At their upper ends, the casings are preferably provided with the yieldable supports 55a and 55b (not shown) in the manner of the device of Figure 5. At their lower open ends, the casing 1 is provided with the bead 100, while the casing 8 is provided with the bead 101. A closure member 150 closes the open end of casing 1 and a closure member 151 closes the open end of casing 8.

Each of these closure members is of cup-shaped configuration, and is necked in to provide a seat 152 for the reception of a gasket 153. Preferably, the seat 152 is disposed a sufficient distance below the upper marginal edge of the closure members to permit portion 154 of the walls thereof to guide the beads 100 and 101 to their seats on the gaskets 153.

The bottom wall 155 of closure member 151 has a plurality of feet 156 disposed on the upper surface thereof, and a plurality of feet 157 disposed on the lower surface thereof. An upper and lower foot is preferably disposed in vertical alignment and connected to bottom wall 155 by a pin 158 which extends through an opening in the wall 155 and into each foot.

Feet 157 seat in an annular channel 159 formed in bottom wall 160 of closure member 150, and feet 156 engage in an annular channel 161 formed in bottom wall 162 of the lowermost food tank. Feet 157, therefore, support closure member 151 out of contact with closure member 150 and restrain lateral movement of closure member 151 toward outer casing 1, while the feet 156 support the nested food tanks out of contact with the closure member 151 and restrain lateral movement of said tanks toward the casing 8.

The construction of the food tanks in this form of the device is substantially identical with the construction of the tanks shown in Figure 5. However, the tanks employed in a picnic box are much larger than the tanks employed in the ordinary lunch box, and it has been found that with such size tanks a powerful vacuum is set up within the tanks upon cooling of the hot food, which makes it exceedingly difficult to remove the closure members therefrom. To overcome this difficulty, each of the closure members has been provided with a vacuum destroying device, designated generally at 164. This vacuum destroying device comprises a generally conical-shaped member 165 of suitable resilient heat insulating material. The member normally has a relatively tight fit in an opening 166 of the closure member and is provided at its lower end with a head 167 and at its opposite end with a knob 168, which are connected to member 165 by a pin 169 extending therethrough. When it is desired to remove the closure member from its respective tank, the knob 168 may readily be grasped to pull member 165 out of the opening 166, or to so twist the member 165 that air may be permitted to flow through opening 166 into the tank, thereby destroying the vacuum within the tank and permitting the closure member to be readily removed therefrom.

The device of Figure 8 is adapted for carrying chop suey, ice cream, or beverages, such, for example, as beer, which is now being marketed in cans. The construction of the device is substantially similar to the construction of the device of Figure 1, except that in the instant case the plurality of food tanks have been replaced with a single tank 173 which has the closure member 46 closing its upper end. This tank 173 is supported within casing 8, at its lower end, by the insulated knob 52, while at its upper end the tank is supported and restrained from moving laterally by the yieldable support 55 which engages in the depression 70 of closure member 46. Tank 173 is adapted to receive a plurality of tanks or cans 174. These cans contain a beverage, such as beer, and are relatively flat on their ends so that they may be stacked one upon the other, as shown. Preferably, crushed ice 175 is packed about the cans to cool the beverage therein. In this form of the device, tray 39 may be utilized to carry a can-opener, while closure member 20 may be employed to carry cheese sandwiches, pretzels, or a similar article of food.

Figure 9:
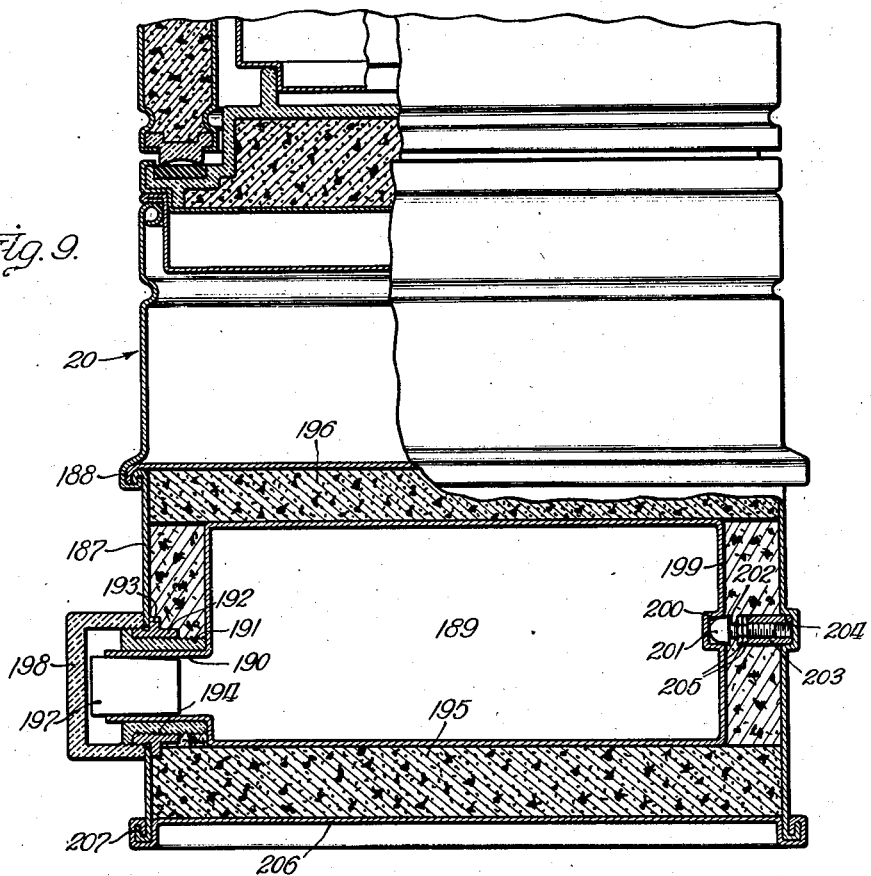
Figure 9 is a fragmentary view, partly in section and partly in front elevation, of a lunch box of the character described, having means secured thereto for carrying a supply of drinking water.

Figure 9 shows the device of Figure 1 provided with a compartment for carrying a supply of drinking water. This compartment is disposed below closure member 20 and comprises an outer casing 187 secured to closure member 20 as indicated at 188. A second casing, in the form of a flask 189, is disposed in casing 187 and is provided with a neck 190, which neck extends outwardly therefrom through an opening in casing 187. Neck 190 is secured within the opening in casing 187 by means of a sleeve 191 of suitable heat insulating material, and by a second sleeve 192, preferably formed of metal. Sleeve 192 is provided with a peripheral flange 193, by means of which it is spot welded to the inner surface of the side wall of casing 187, while sleeve 191 is secured to neck 190 as by cementing, or in any other suitable or preferred manner, and is externally threaded to cooperate with internal threads on sleeve 192, as indicated at 194. Inasmuch as sleeve 192 is threaded within sleeve 191 and cemented to neck 190 of the flask, the neck of the flask will therefore be held against movement in either direction with respect to the opening in casing 187. Discs 195 and 196, formed of cork or other suitable heat insulating material, serve to support and insulate flask 189 from casing 187, while a cork stopper 197 closes the neck 190 of the flask. An internally threaded cup 198 which, if desired, may be used as a drinking cup, cooperates with the external threads formed on the sleeves 191 and 192 and serves to conceal the outer end of the sleeve, and thereby to present a neat appearance.

Preferably, the side wall 199 of the flask, diametrically opposite the neck 190, is pressed inwardly to form a recess 200 for the reception of the head 201 of a bolt 202. This bolt threads into one end of a heat insulating block 203, the opposite end of the block being carried in a recess 204 formed in casing 187. Cooperating nuts 205 serve to lock bolt 202 against movement with respect to block 203.

In assembling the device, the sleeve 192 is first spot welded in place, after which the cork disc 196 is inserted in casing 187. Flask 189 is then seated on disc 196 and with its neck projecting outwardly through the opening in casing 187. Sleeve 191 is then threaded into sleeve 192 and, at the same time, cemented to neck 190 of the flask. The bolt 202 and block 204 are then put in place and the bolt turned outwardly to force the flask into tight abutting engagement with the sleeve 191. This bolt and block serve to retain the flask in such position until the cement between the sleeve and the neck of the flask is dry and, in addition, serve to help support the flask within casing 187. Granulated cork is now poured into the space between the side walls of flask 199 and casing 187 and the cork disc 195 is then put into place, after which the bottom wall 206 of casing 187 is seamed thereto, as indicated at 207.

Figure 10:
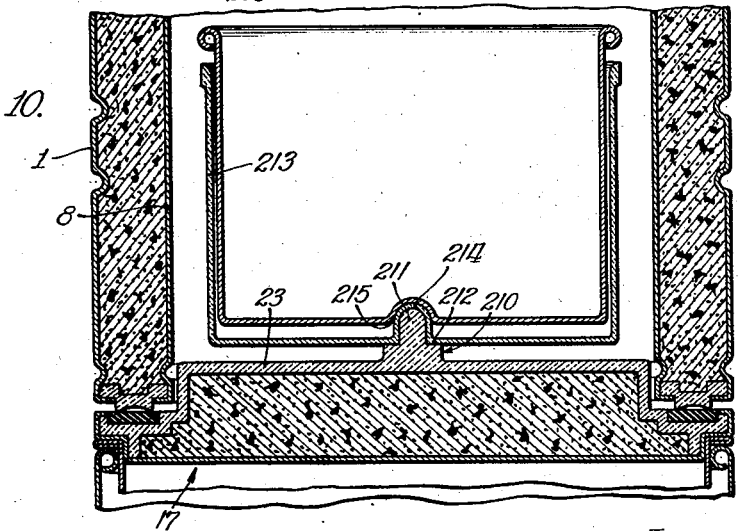
Figure 10 is a fragmentary vertical sectional view of a lunch box embodying the principles of the present invention and showing a single centrally located point of support for supporting the nested food tanks out of contact with the divider, and restraining lateral movement of said tanks with respect to said inner casing.

Figure 10 shows a modified form of the single centrally located point of support which is associated with the insulated divider and the lowermost food tank to support the food tanks out of contact with the top wall of the divider, as well as to restrain lateral movement of the tanks with respect to the inner casing. In this form of the device, the top wall 23 of the divider is provided, substantially centrally thereof, with a single upwardly projecting foot 210 formed integrally therewith. This foot preferably has its upper end reduced in diameter, as indicated at 211, to form a shoulder 212. A cup or tank 213, preferably formed of a heat insulating material such as "Bakelite" and provided with an upwardly projecting recessed boss 214, is adapted to seat on shoulder 212, and with the reduced portion 211 of the foot engaging in the recess in boss 214. This provides a rigid mounting of the cup with respect to the foot. Cup 213 is adapted to receive the lowermost food tank, and this tank, as well as each of the other tanks which are associated therewith in nested relation as shown, for example, in Figure 1, is provided with a central upwardly pressed portion to provide a recess 215. Boss 214 engages in recess 215 to thereby support the tank upon foot 210. It will be apparent, therefore, that the foot 210 will support the food tank out of contact with divider 17 and, by reason of boss 214 engaging in recess 215 of the lowermost food tank, such tank will be restrained from lateral movement toward casing 8. In this form of the device the uppermost food tank is preferably supported by a yieldable support, such as that shown at 55 in Figure 1. This provides two centrally located points of support for the nested food tanks, one at the top of the nested assembly and one at the bottom thereof. Cup 213 is normally out of contact with the upper end of the lowermost food tank as shown, and it performs three separate and distinct functions. It provides means to centrally locate the nested food tanks on one centrally located point of support; it provides a separate and additional air space about the lowermost food tank and thereby cuts down the heat loss of said tank, and it provides an insulating means about the tank which may be grasped by the hand when it is desired to drink a hot liquid from the tank, thereby eliminating any danger of burning the hand, which might occur if the hot tank were grasped directly by the hand.

Figure 11 shows a box provided with a plurality of insulated compartments, one of which is adapted to receive food tanks filled with hot foods and another of which is adapted to receive food tanks filled with cold food. The box comprises an upper container 215, which forms the hot food compartment 216 and a lower container 217, which forms the cold food compartment 218. Each of these containers is formed in substantially the same manner as the device of Figure 1, in that they each comprise an outer casing 1 and an inner casing 8 rigidly secured together at their open ends by means of a collar 13. However, in the present case, top wall 219 of container 217 is similar in construction to the top wall of the divider 17 of Figure 1. This top wall is provided with the annular ring 64 and the insulating knob 52, and is secured to outer casing 1 of container 217 by means of the annular channel 220. Collar 13 of container 215 seats on a gasket 221 carried by top wall 219, and the containers 215 and 217 are secured together by fastening devices such as that shown, for example, at 36 in Figure 1. The food tanks containing the hot food are received in compartment 216 and are supported therein upon the insulating knob 52 and by the yieldable knob 55, as more particularly set out in connection with the device of Figure 1.

The open end of container 217 is closed by the insulated divider 17 of Figure 1, and the compartment 218 receives the cold food tanks which seat upon the insulating knob 52 of this divider and are supported at their upper ends by yieldable knob 55. As in the device of Figure 1, the divider 17 is secured to container 217 by the closure member 20. This closure member also receives the tray 39 which is interposed between the divider and the bead of the closure member.

The aforementioned box is adapted to receive an entire meal. For example, the uppermost of the hot food tanks may be filled with soup, the intermediate tank with coffee, and the lowermost tank with meat, potatoes, and a vegetable, this lowermost tank preferably being divided in such manner as to maintain the various elements contained therein in separated condition. The uppermost tank in the cold food compartment may be employed for ice cream, the lowermost tank for celery hearts, olives, pickles, radishes and the like, while the tray 39 may be employed to carry napkins, knives, forks, or spoons, and the portions of the closure member below such tray employed to carry bread, crackers, pies and cake, or the like.

Figure 12 shows a modified form of the insulated divider. The construction of the divider is similar to the divider of Figure 1, but differs therefrom in that the top wall 23b has the guide portion 71 (of Figure 1) omitted therefrom and replaced by upwardly projecting guide feet 225 formed integrally with the top wall. Also, in place of the annular ring 64, the top wall is provided with a plurality of upwardly projecting feet 226 to support the lowermost food tank upon the single point of support 52' while the tank is being packed with food. Preferably, wall 23b is provided with a depending recessed boss 227, formed integrally therewith and disposed immediately below knob 52'. This boss provides a spacing and supporting means between the walls 23b and 21.

Also, this form of the device shows the manner of providing a yieldable support for the lowermost food tank. This support comprises the shaft 230 having its head 231 moulded into top wall 23b of the divider. This shaft, as shown, is disposed in recess 53' and extends upwardly thereabove, where it is beaded over a flange 232 formed on a sleeve 233, as indicated at 234. Sleeve 233 embraces shaft 230 and seats on the wall 235 of recess 53', and thereby holds the shaft rigid with respect to divider 17. The insulating knob 52' is provided with a bore 236, and an internal guide 237 formed in the bore of said knob embraces the sleeve to guide the knob for relative sliding movement with respect thereto. A compression spring 238 biased between guide 237 and the wall 235 normally urges the knob upwardly with respect to shaft 230 and sleeve 233. Knob 52' engages in the recess 54' of the lowermost food tank in the manner and for the same purpose as the knob 52 of Figure 1. In addition, this knob yieldingly urges the nested food tanks together, for the same purpose as the knob 55 of Figure 1. It may here be pointed out that knob 52' may be employed in conjunction with knob 55 to provide two centrally disposed yieldable points of support for the nested food tanks; or the knob 52' may be employed to support the lowermost food tank and the knob 55 may be replaced with a knob similar to that shown at 52 in Figure 1, thereby providing a yieldable knob for the lowermost tank and a rigid knob for the uppermost tank; or the tanks may be supported in the manner shown in Figure 1. In each case, there is at least one yieldable point of support associated with either the uppermost or the lowermost food tank to yieldingly support the nested tanks within casing 8. It will also be apparent that, if desired, a plurality of yieldable knobs 52' may be employed for supporting the lowermost food tank, these knobs being arranged upon the divider in the same manner as the feet 92 are arranged thereon, as shown in Figure 3.

As will be understood by those skilled in the art, while I have shown several preferred embodiments of my invention, I do not wish to be limited thereto, since changes may be made therein without departing from the spirit and scope of the invention.

What I claim is:

1. In combination, an outer casing, an inner casing disposed within said outer casing and thermally insulated therefrom, each of said casings being normally open at one end and said inner casing being adapted to receive a plurality of nested food tanks, the lowermost tank of said nested food tanks having a plurality of recesses pressed upwardly in the bottom wall thereof, closure means adapted to close the open ends of said casings, and a plurality of feet carried by said closure means and adapted for engagement with the lowermost tank of the nested food tanks to support said tank within said inner casing and out of contact with said closure means, said feet engaging in the recesses in said lowermost tank with a relatively snug fit and thereby restraining lateral movement of said tank with respect to said inner casing and said closure means.

2. The combination with a casing normally closed at one end and open at its opposite end, said casing being adapted to receive a plurality of nested food tanks, and closure means for the open end of said casing, of means associated with said closure means and adapted for engagement with the lowermost tank of the nested food tanks to support said tank within said casing and out of contact therewith and with said closure means, and axially yieldable means interposed entirely between the closed end of said casing and the uppermost tank of the nested food tanks, said yieldable means constituting the sole means for restraining lateral movement of said uppermost tank with respect to said casing and being normally maintained between the closed end of said casing and said tank under compression to thereby yieldingly urge said tanks together.

3. The combination with, an outer casing, an inner casing disposed within said outer casing and thermally insulated therefrom, each of said casings being normally closed at one end and open at its opposite end, and said inner casing being adapted to receive a plurality of nested food tanks, and closure means adapted to close the open ends of said casings, of means associated with said closure means and adapted for engagement with the lowermost tank of the nested food tanks to support said tank within said inner casing and out of contact therewith and with said closure means, and a single spring pressed knob axially positioned between the closed end of said inner casing and the uppermost tank of the nested food tanks, said knob constituting the sole member directly engaging said uppermost tank for restraining lateral movement thereof with respect to said inner casing and being operative to yieldably urge said tanks together.

4. The combination with, an outer casing, an inner casing disposed within said outer casing and thermally insulated therefrom, each of said casings being normally closed at one end and open at its opposite end, and said inner casing being adapted to receive a plurality of nested food tanks, and closure means adapted to close the open ends of said casings, of means associated with said closure means and adapted for engagement with the lowermost tank of the nested food tanks to support said tank within said inner casing and out of contact therewith and with said closure means, a single knob disposed between the closed end of said inner casing and the uppermost tank of said nested food tanks, means connecting said knob to the closed end of said inner casing for axial movement with respect thereto, and means normally urging said knob into engagement with said uppermost food tank, to impose an axial pressure thereon, said knob constituting the sole member in engagement with said uppermost tank to restrain lateral movement thereof with respect to said inner casing.

5. In combination, an outer casing, an inner casing disposed within said outer casing and out of contact therewith, each of said casings being normally closed at one end and open at its opposite end, and said inner casing being adapted to receive a plurality of nested food tanks, a separate closure member for the open end of each of said casings, means associated with one of said closure members and cooperating with the other of said closure members to restrain lateral movement of said first-named closure member and the open end of said inner casing with respect to said outer casing, said last named means including means to support the lowermost tank of the nested food tanks out of contact with said closure members and to restrain lateral movement of said tank with respect to said casings, means associated with the closed ends of said casing yieldingly supporting said inner casing against axial movement within said outer casing and restraining lateral movement of said inner casing with respect to said outer casing, and means associated with said inner casing and adapted to engage the uppermost tank of the nested food tanks to yieldingly urge said nested tanks together and to restrain lateral movement of said nested tanks as a unit with respect to the inner casing.

6. In combination, an outer casing, an inner casing disposed within said outer casing and out of contact therewith, each of said casings being normally closed at one end and open at its opposite end and said inner casing being adapted to receive a plurality of nested food tanks, a separate closure member for the open end of each of said casings, means associated with one of said closure members and cooperating with the other of said closure members to restrain lateral movement of said first-named closure member and the open end of said inner casing with respect to said outer casing, said last-named means including means to support the lowermost tank of the nested food tanks out of contact with said closure members and to restrain lateral movement of said tank with respect to said casing, means comprising a yieldable support yieldably supporting said inner casing against axial movement within said outer casing and restraining lateral movement of said inner casing with respect to said outer casing, and means comprising a yieldable support adapted to engage the uppermost tank of the nested tanks to yieldably urge said nested tanks together and to restrain lateral movement of said nested tanks as a unit with respect to the inner casing, and common means connecting said yieldable supports to said inner casing.

7. In combination with an outer casing, an inner casing disposed within said outer casing and thermally insulated therefrom, and closure means for said casings, of a plurality of food tanks and closure members therefor, said tanks being adapted to be disposed within said inner casing by the closure member therefor and with certain of said tanks superposed on the closure members of other tanks, and means carried by the closure members of said tanks and providing a steam tight fit therebetween, said last named means also providing a seat for a superposed tank and a spacing means for holding said superposed tank out of contact with the closure member, thereby providing an air space between the tank and the closure member to effectively insulate said tanks from each other.

8. In combination, an outer casing, an inner casing disposed within said outer casing and thermally insulated therefrom, each of said casings being normally open at one end and said inner casing being adapted to receive a plurality of nested food tanks, closure means adapted to close the open ends of said casings, a single point of support associated with said closure means and adapted for engagement with the lowermost tank of the nested food tanks to support said tank within said inner casing and out of contact with said closure means, and means carried by and projecting upwardly from said closure means and disposed between said closure means and said lowermost food tank and limiting teetering of said tank about said single point of support when the tank is being packed with food.

9. In combination, a casing normally open at one end and adapted to receive a tank, closure means for the open end of said casing, a shaft secured to said closure means and projecting upwardly thereabove, a knob mounted on said shaft for axial movement with respect thereto, and spring means normally urging said knob into contact with said tank to thereby support said tank within said casing and out of contact with said closure means.

JAMES H. DEVINE.